(No Model.)
2 Sheets—Sheet 1.
E. F. HUSK.
SULKY CULTIVATOR.
No. 310,828.
Patented Jan. 13, 1885.
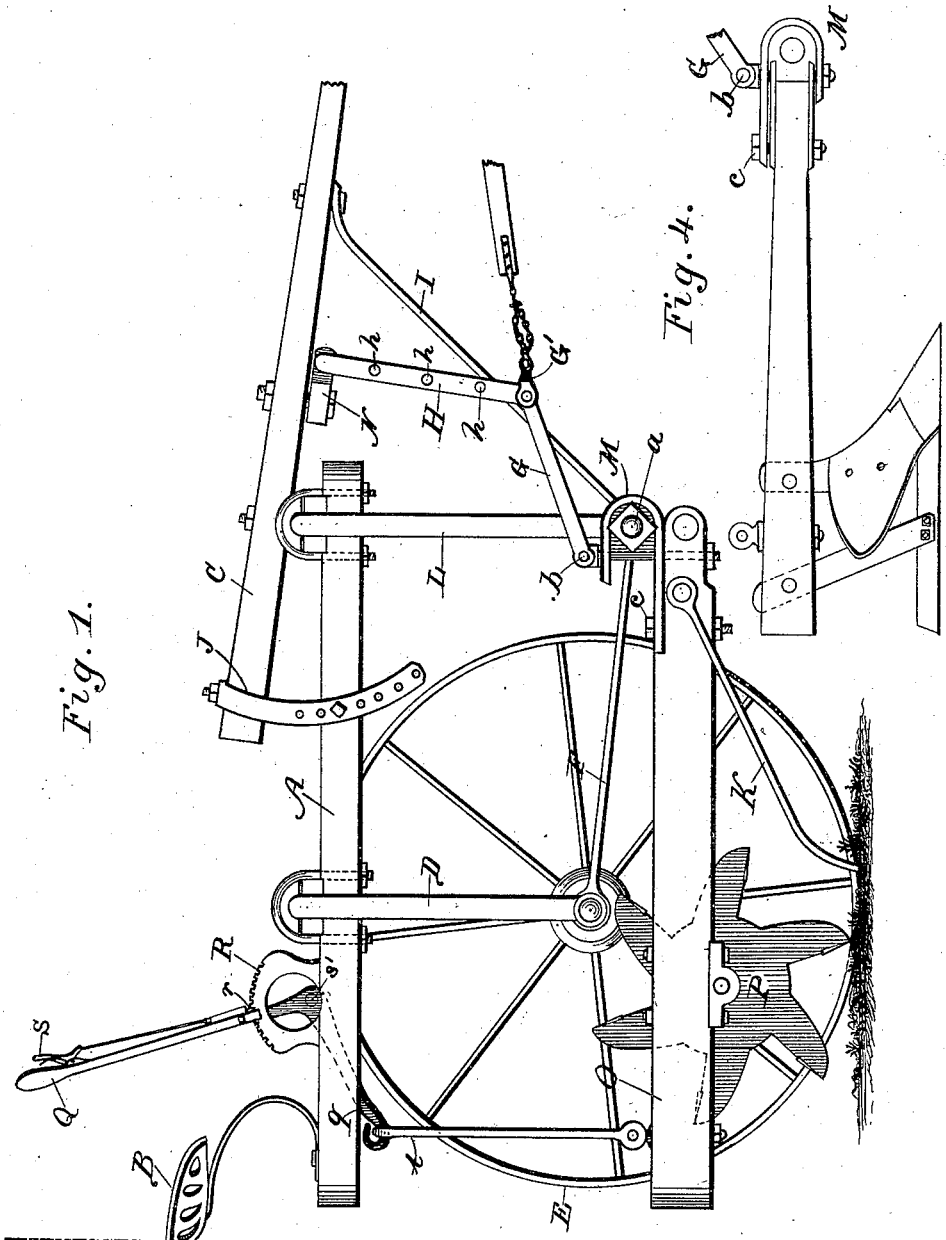
WITNESSES:
Thos Houghton.
W. X. Stevens.
INVENTOR:
E. F. Husk
BY Munn & Co
ATTORNEYS.

(No Model.) 2 Sheets—Sheet 2.

E. F. HUSK.
SULKY CULTIVATOR.

No. 310,828. Patented Jan. 13, 1885.

WITNESSES:
Thos. Houghton.
W. X. Stevens.

INVENTOR:
E. F. Husk
BY Munn
ATTORNEYS.

UNITED STATES PATENT OFFICE.

EDWARD FRANKLIN HUSK, OF MALDEN, MISSOURI.

SULKY-CULTIVATOR.

SPECIFICATION forming part of Letters Patent No. 310,828, dated January 13, 1885.

Application filed July 9, 1884. (No model.)

*To all whom it may concern:*

Be it known that I, E. F. HUSK, a citizen of the United States, residing at Malden, in the county of Dunklin and State of Missouri, have invented certain new and useful Improvements in Sulky-Cultivators, of which the following is a description.

This invention relates to that class of devices which are used for the various acts of cultivation—such as deep plowing, shovel-plowing, cutting stalks, &c.—and which comprise a frame, a team-pole, and a driver's seat mounted on wheels, and one or more plows or other implements adapted to be hitched to the frame; and its object is to provide a machine on which the driver may ride, while the machine straddles a row of growing corn, to plow or cultivate the earth on both sides of the corn, and to cut the cornstalks into short pieces after the corn has been gathered, so that the stalks may not obstruct subsequent cultivation, and may be more readily rotted, to manure the land.

To this end my invention consists in the construction and combination of parts forming a sulky-cultivator, hereinafter described and claimed, reference being had to the accompanying drawings, in which—

Figure 5:
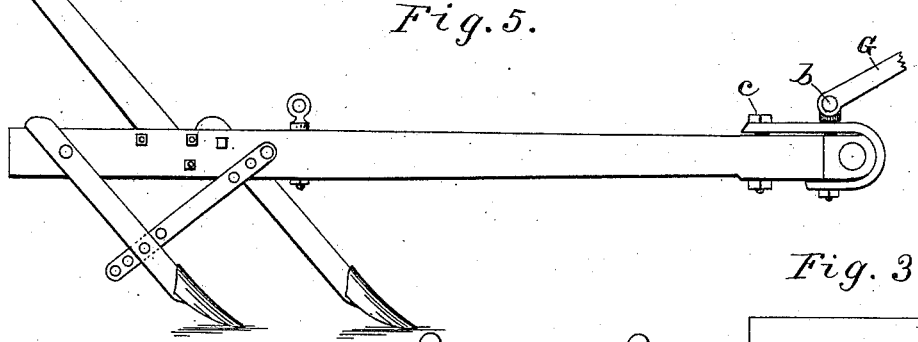
Figure 3:
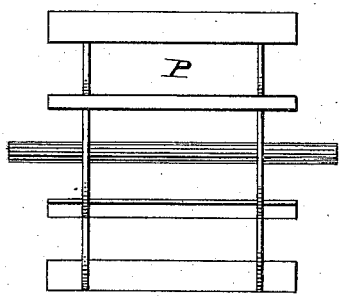
Figure 2:
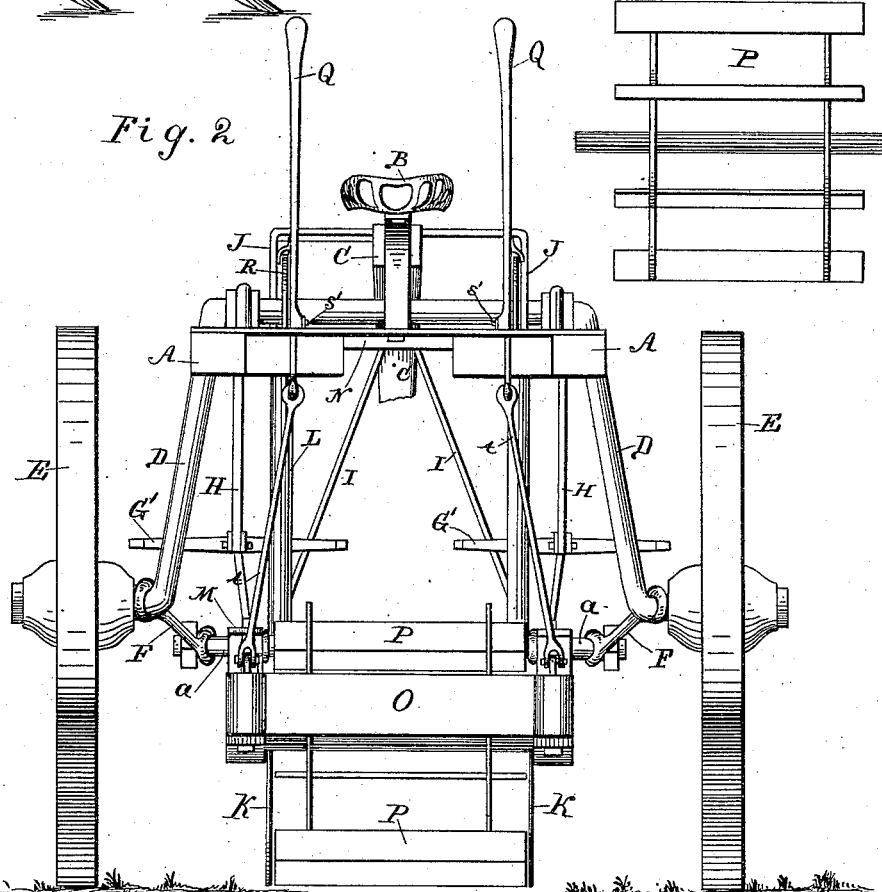

Figure 1 is a side elevation of my cultivator in one of its forms, with one wheel removed. Fig. 2 is a rear elevation of the same. Fig. 3 is a plan view of a stalk-cutter attachment. Fig. 4 is a side elevation of a deep plow; and Fig. 5 is a side elevation of a shovel-plow, forming parts of my invention.

The deep plows, the shovel-plows, and the stalk-cutters all being used in cultivating the soil, will, in general terms, be called "cultivators."

A represents the frame of the machine, provided with a seat, B, for the driver, and a team-pole, C. This frame is secured to an axle, D, which is mounted on wheels E. The axle has a very high upward bend along its middle portion, to pass over a row of corn, while the wheels run on both sides of the row.

L represents a hanger similar in form to the axle, the two arms *a* being used to attach the different cultivators to.

F is a brace connecting the arm *a* with the arm of the axle D, and I is a brace connecting the arm *a* with the tongue C. By means of these two braces the hanger L is rigidly held fore and aft, so that any kind of a cultivator may be drawn thereby.

In order that the pole may pass over a row of growing corn, it is attached to the frame A, and the single-trees G' are hung by drop-hangers H, secured to the double-tree N, which is attached to the pole.

To give direct action from the team to the cultivators, a rod or link, G, connects the single-tree G' with the cultivator-beam by means of bolts *b* and *c*.

M is a strap or clevis, adapted to attach either of the cultivators to the arm *a*. When the cultivator has a low beam, as in the case of the stalk-cutter in Fig. 1, the strap M may be secured on top of the beam; but when the cultivator-beam is high, as in the plow shown at Fig. 4, the strap M may be inverted and clasp the end of the plow-beam. The strap being invertible is thus adapted to both high and low beams.

To further regulate the height of the cultivator-beam, I attach the rear end of the team-pole to the frame A by means of a bar, J, extending across the frame and curved at the ends, and provided with a series of adjusting-holes through any one of which and through a hole in the frame a pin may pass to hold the pole fixed as desired. The forward end of the pole is supposed to be carried by the team at about a fixed height from the ground, so that if the rear end of the pole be raised it raises the forward end of the frame A, with the hanger *a* L, and any beam that may be attached thereto. The plows may be provided with any common clevis; but I prefer the method of attachment described.

O represents the frame of the stalk-cutter, which extends across the line of the corn-row, and is attached to both arms *a* of the hanger L.

P is the stalk-cutter, consisting of a heavy roller journaled in the rear portion of frame O, and a series of sharp radial blades secured to the roller. When the machine advances, this heavy-bladed roller travels directly upon the row of cornstalks, cutting them into short pieces.

K K are two hooks, hung to the forward portion of the frame, to scratch on the ground and pull any stalks which have fallen diagonally into the path of the cutter.

Q Q are the handles of two levers, pivoted to the frame A at $s'$.

$q\ q$ are the lower arms of these levers, bent at their ends into hooks, upon which chains or rods are hung to raise or lower the stalk-cutter, so that the blades thereof may be carried above the ground or may be allowed to bury to any required extent into the ground. These levers Q Q $q\ q$ are maintained at the desired angle by means of an arc of teeth, R, fixed to the frame A, and a latch, $r$, mounted to slide on the handles Q.

S S are hand-levers for drawing the latches.

The plows or other cultivators may be connected to the same levers, or to other similar levers, to be raised or to be drawn out of the ground.

The drop-hangers H are provided each with a series of holes, $h$, for adjusting the height of the line of draft of the team by attaching the single-trees higher or lower.

Either the deep plows or the shovel-plows may be provided with common handles, so that they may be used separately from the machine like common plows.

The tongue C, the hangers L, and the braces form a rigid triangle, so that if the forward end of the tongue be raised and the arc J be allowed to descend relative to frame A the hangers L and the axle D will be tipped backward, both being secured to frame A by rocking joints.

Cotton and other grain besides corn may be cultivated and cut by this machine.

What I claim as my invention, and desire to secure by Letters Patent, is—

1. The combination, with a pair of wheels, an axle therefor curved upward midway, and a frame hung to the raised portion of the axle by a rocking joint, of a tongue, C, and a pair of hangers, L, hung to the frame by a rocking joint, a pair of braces, I, connecting the arms of the hangers with the tongue, a pair of braces, F, connecting the arms of the hangers with the arms of the wheel-axle, and means, substantially as described, for adjusting the tongue vertically to the frame, as and for the purpose specified.

2. The combination, with the plow-beam, the link G, and the bolts $b$ and $c$, of the invertible clevis-strap M, as shown and described.

EDWARD FRANKLIN HUSK.

Witnesses:
 THORNTON A. SLICER,
 GREEN DAVIS.